(12) United States Patent
Kupratis et al.

(10) Patent No.: US 10,794,216 B2
(45) Date of Patent: Oct. 6, 2020

(54) FAN DRIVE GEAR SYSTEM DC MOTOR AND GENERATOR

(71) Applicant: United Technologies Corporation, Farmington, CT (US)

(72) Inventors: Daniel Bernard Kupratis, Wallingford, CT (US); Frederick M. Schwarz, Glastonbury, CT (US); William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 24 days.

(21) Appl. No.: 16/012,059

(22) Filed: Jun. 19, 2018

(65) Prior Publication Data

US 2019/0383157 A1    Dec. 19, 2019

(51) Int. Cl.
| | |
|---|---|
| *F01D 15/10* | (2006.01) |
| *F02C 7/36* | (2006.01) |
| *F02K 3/06* | (2006.01) |
| *H02K 11/00* | (2016.01) |
| *H02K 7/18* | (2006.01) |

(52) U.S. Cl.
CPC .............. *F01D 15/10* (2013.01); *F02C 7/36* (2013.01); *F02K 3/06* (2013.01); *H02K 7/1823* (2013.01); *H02K 11/0094* (2013.01)

(58) Field of Classification Search
CPC ......... F01D 15/00; F02C 7/36; H02K 7/1823; H02K 11/0094
See application file for complete search history.

(56) References Cited

U.S. PATENT DOCUMENTS

| | | | | |
|---|---|---|---|---|
| 4,246,531 | A * | 1/1981 | Jordan ..................... | H02P 9/42 322/28 |
| 5,023,537 | A * | 6/1991 | Baits ....................... | F02N 11/04 290/4 R |
| 5,508,574 | A * | 4/1996 | Vlock .................... | B60K 6/445 310/113 |
| 5,731,649 | A * | 3/1998 | Caamano ................. | H02K 1/02 310/179 |
| 6,278,211 | B1 * | 8/2001 | Sweo ..................... | H02K 16/00 310/114 |
| 6,771,000 | B2 * | 8/2004 | Kim ....................... | F01D 15/10 310/156.16 |
| 7,301,311 | B2 * | 11/2007 | Xu ......................... | H02K 19/12 322/29 |
| 7,863,868 | B2 * | 1/2011 | Xu ......................... | H02K 19/26 322/44 |

(Continued)

*Primary Examiner* — Tulsidas C Patel
*Assistant Examiner* — Joseph Ortega
(74) *Attorney, Agent, or Firm* — Carlson, Gaskey & Olds, P.C.

(57) ABSTRACT

A gas turbine engine according to an exemplary embodiment of this disclosure includes, among other things, a fan driven by a fan shaft rotatable about an engine axis; a fan drive electric motor providing a supplemental drive input to the fan; a turbine section driving an input shaft; a geared architecture driven by the input shaft of the turbine section and coupled to the fan shaft to provide a main drive input for driving the fan; and a generator including a rotor supported on the input shaft and a stator disposed on a static structure relative to the rotor, wherein the generator communicates electric power to power the fan drive electric motor.

12 Claims, 5 Drawing Sheets

(56) References Cited

U.S. PATENT DOCUMENTS

| | | | | |
|---|---|---|---|---|
| 8,212,445 B2* | 7/2012 | Ritchey | H02K 7/108 | 310/112 |
| 8,844,265 B2* | 9/2014 | Adams | F02C 3/04 | 60/226.1 |
| 10,364,037 B2* | 7/2019 | Armstrong | B64D 31/06 | |
| 2005/0023924 A1* | 2/2005 | Tornquist | H02K 3/527 | 310/216.121 |
| 2005/0206352 A1* | 9/2005 | Xu | H02K 23/52 | 322/52 |
| 2006/0087123 A1* | 4/2006 | Stout | F02C 7/268 | 290/2 |
| 2006/0087293 A1* | 4/2006 | Xu | H02P 9/007 | 322/59 |
| 2010/0219779 A1* | 9/2010 | Bradbrook | F02C 7/32 | 318/153 |
| 2013/0125561 A1* | 5/2013 | Schwarz | F02K 3/06 | 60/802 |
| 2015/0244296 A1* | 8/2015 | Edwards | F01D 15/10 | 290/40 B |
| 2016/0024968 A1* | 1/2016 | Stearns | F01D 25/12 | 60/39.08 |
| 2016/0097328 A1* | 4/2016 | Wintgens | F02C 7/32 | 415/1 |
| 2016/0130970 A1* | 5/2016 | Blazer | H02P 25/03 | 290/7 |
| 2016/0138477 A1 | 5/2016 | Otto et al. | | |
| 2016/0177770 A1* | 6/2016 | Adams | H02K 16/04 | 290/46 |
| 2016/0195096 A1* | 7/2016 | Otto | F04D 25/045 | 415/1 |
| 2017/0051667 A1* | 2/2017 | Godman | F04D 29/601 | |
| 2017/0268423 A1* | 9/2017 | Schwarz | H02K 7/1823 | |
| 2017/0306887 A1 | 10/2017 | Sabnis | | |
| 2018/0010551 A1 | 1/2018 | Sheridan | | |
| 2018/0045119 A1 | 2/2018 | Sheridan et al. | | |
| 2018/0118364 A1* | 5/2018 | Golshany | B64D 27/24 | |
| 2018/0149038 A1* | 5/2018 | Eriksen | B08B 3/003 | |
| 2018/0178920 A1* | 6/2018 | Swann | B64D 31/06 | |
| 2018/0283464 A1* | 10/2018 | Altamura | F16D 9/08 | |
| 2019/0003398 A1* | 1/2019 | Gibson | F02C 7/275 | |
| 2019/0085765 A1* | 3/2019 | Nolcheff | B60R 16/03 | |
| 2019/0153957 A1* | 5/2019 | Juretzek | H02K 9/16 | |
| 2019/0233128 A1* | 8/2019 | Klonowski | H02K 21/48 | |
| 2019/0245466 A1* | 8/2019 | Miyatake | H02P 9/08 | |

* cited by examiner

FAN DRIVE GEAR SYSTEM DC MOTOR AND GENERATOR

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Incorporation of electric power in gas turbine engines is currently substantially limited to accessory components. Advances in electric motors and generators along with demands for ever increasing engine operating efficiencies warrant consideration of alternate engine configurations.

Geared architectures have improved propulsive efficiency and prompted turbine engine manufacturers to seek further improvements to engine performance including improvements to propulsive efficiencies.

SUMMARY

A gas turbine engine according to an exemplary embodiment of this disclosure includes, among other possible things, a fan driven by a fan shaft rotatable about an engine axis; a fan drive electric motor providing a supplemental drive input to the fan; a turbine section driving an input shaft; a geared architecture driven by the input shaft of the turbine section and coupled to the fan shaft to provide a main drive input for driving the fan; and a generator including a rotor supported on the input shaft and a stator disposed on a static structure relative to the rotor, wherein the generator communicates electric power to power the fan drive electric motor.

In a further embodiment of the foregoing gas turbine engine, the generator includes a first stator and a first rotor including a first set of poles providing power to a first phase of the fan drive electric motor. A second stator and a second rotor includes a second set of poles providing power to a second phase of the fan drive electric motor.

In a further embodiment of any of the foregoing gas turbine engines, the fan drive electric motor is electrically coupled to the first stator and the second stator and the first set of poles. The second set of poles are clocked relative to each other such that rotation of the input shaft commutates the first phase and the second phase to drive the fan drive electric motor.

In a further embodiment of any of the foregoing gas turbine engines, the fan drive electric motor includes a permanent magnet rotor including a plurality of poles corresponding with the first set of poles and the second set of poles of the generator.

In a further embodiment of any of the foregoing gas turbine engines, the geared architecture is configured to provide a ratio between an input speed of the input shaft and an output speed of the fan shaft. Commutation of the plurality of poles of the fan drive electric motor corresponds with the gear ratio and the number of poles in each of the first set of poles and the second set of poles.

In a further embodiment of any of the foregoing gas turbine engines, the first rotor is spaced axially apart from the second rotor on the input shaft.

In a further embodiment of any of the foregoing gas turbine engines, a controller is included to control the communication of electric power to the fan drive electric motor.

In a further embodiment of any of the foregoing gas turbine engines, a battery coupled to the generator is included. The generator provides electric power to charge the battery.

In a further embodiment of any of the foregoing gas turbine engines, a controller coupled to the fan drive electric motor and the generator is included. The controller is configured to control operation of the fan drive electric motor and the generator.

A fan drive system for a gas turbine engine according to an exemplary embodiment of this disclosure includes, among other possible things, a fan driven by a fan shaft rotatable about an engine axis; a fan drive electric motor providing a supplemental drive input to the fan; a geared architecture driven by an input shaft and coupled to the fan shaft to provide a main drive input for driving the fan; and a generator means driven by the input shaft configured to generate electric power and for driving the fan drive electric motor.

In a further embodiment of the foregoing fan drive system for a gas turbine engine, the generator means includes a first stator and a first rotor including a first set of poles providing electric power to a first phase of the fan drive electric motor. A second stator and a second rotor that include a second set of poles that provide power to a second phase of the fan drive electric motor is also included.

In another embodiment of any of the foregoing fan drive systems, the first set of poles and the second set of poles are clocked relative to each other such that rotation of the input shaft commutates the first phase and the second phase to drive the fan drive electric motor.

In another embodiment of any of the foregoing fan drive systems, the geared architecture is configured to provide a ratio between an input speed of the input shaft and an output speed of the fan shaft. Commutation of the plurality of poles of the fan drive electric motor corresponds with the gear ratio and the number of poles in each of the first set of poles and the second set of poles.

In another embodiment of any of the foregoing fan drive systems, a controller configured to control operation of the fan drive electric motor and the generator is included.

A method of operating a gas turbine engine according to an exemplary embodiment of this disclosure includes, among other possible things, generating electric energy with a generator driven by an input shaft driving a geared architecture at a first speed; driving a fan shaft at a second speed different than the first speed with a primary rotational input from the geared architecture; and driving the fan shaft with a supplemental rotational input with a fan drive electric motor driven by electric energy generated by the generator disposed on the input shaft.

In a further embodiment of the foregoing method of operating a gas turbine engine, the generator comprises a first generator portion providing electric power to a first phase of the fan drive electric motor and a first battery, and a second generator providing electric power to a second phase of the fan drive electric motor and a second battery.

In a further embodiment of any of the foregoing methods of operating a gas turbine engine, commutating electric power provided to the first phase and second phase of the electric motor is included by clocking a first set of poles of first generator portion relative to a second set of poles of the second generator portion.

In a further embodiment of any of the foregoing methods of operating a gas turbine engine, the supplemental rotational input engages with the fan drive electric motor responsive to a decreased load on a fan drive turbine driving the input shaft and disengaging the supplemental rotational input responsive to an increased load on the turbine section.

In a further embodiment of any of the foregoing methods of operating a gas turbine engine, operation of the fan drive electric motor is controlled with a controller responsive to a demand for increased power from the fan drive turbine.

In a further embodiment of any of the foregoing methods of operating a gas turbine engine, commutating electric power provided to the first phase and second phase of the electric motor is included by charging and discharging a first battery and a second battery.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
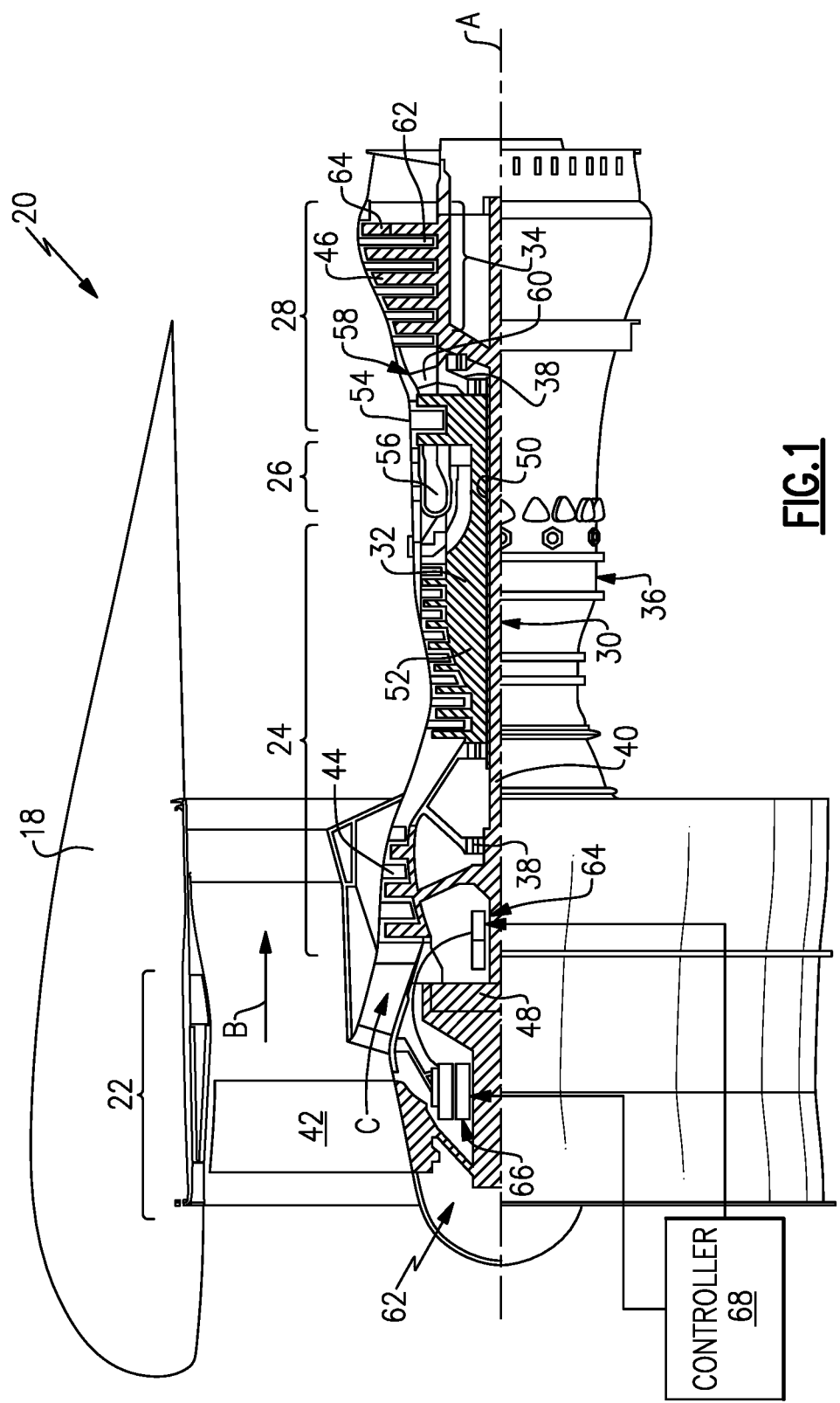
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Changes in environmental conditions can require constant adaptations and adjustments to engine operation to provide a desired propulsive output. For example, fuel flow to the combustor 56 may be adjusted depending both on a desired propulsive power output and input airflow characteristics including pressure and temperatures. Changes in input airflows may change during operation and require adjustment of fuel flow to maintain the desired propulsive output. There is a certain lag between the adjustment and obtaining the operating propulsive output. Although very brief, the lag can affect engine efficiency.

Moreover, changes in power provided by the low pressure turbine 46 driving fan section 22 also will add power to the low pressure compressor 44 and thereby complicate operation. The low pressure compressor 44 matches operation to that of the high pressure compressor 52 and thereby any adjustment to one results in changes to the other. Excessive power input into the low pressure compressor 44 may require that air flow be bled off in order to properly match operation of the high pressure compressor 52.

The disclosed gas turbine engine 20 includes a fan drive system 62 that includes a fan drive electric motor 66 that is driven by a generator 64 driven by the low shaft 40. The generator 64 generates electric power that is controlled by a controller 68 to add power to the fan section 22 parallel to the power provided through the geared architecture 48. Accordingly, the fan drive system 62 enables additional power to be added to drive the fan section 22 to supplement power provided through mechanical means from the fan drive low pressure turbine 46. The fan drive electric motor 66 is more responsive to changes in power demand and thereby can reduce fluctuation in fan operation generated by lags in power transmitted through the mechanical means of the geared architecture 48.

Figure 2:
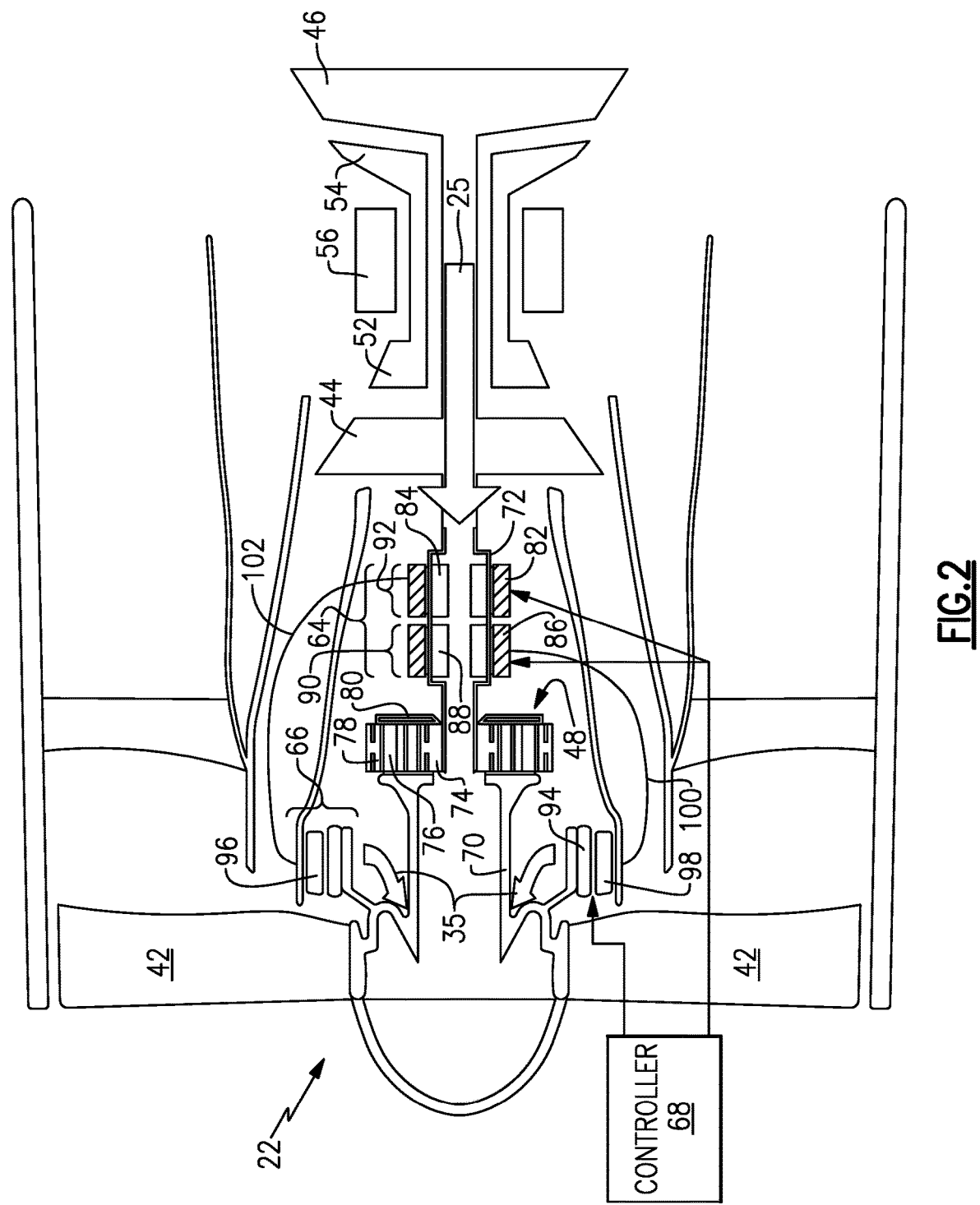
FIG. 2 is a schematic view of an example fan drive system.

Referring to FIG. 2 with continued references to FIG. 1, the fan drive system 62 receives a primary or first drive input 25 from the fan drive turbine 46. A supplemental or second drive input 35 is provided by the fan drive electric motor 66. The supplemental drive input 35 provides additional power to the fan section 22 to, among other possible things, accommodate variations in power output through the first drive input 25. The example fan drive system 62 exploits the speed relationship between the input shaft 72 and the fan shaft 70 inherent in the geared architecture 48. The relative speeds and pole counts of the electric motor 66 and the generator 64 are made complimentary to provide a parallel electric power path to drive the fan section 22.

The example fan drive electric motor 66 is mounted directly to a fan shaft 70 driven by the geared architecture 48. The geared architecture 48 includes a sun gear 74 driven by the input shaft 72 driven by the low pressure turbine 46. The sun gear 74 drives intermediate gears 76 supported by a carrier 80. The intermediate gears 76 rotate within a ring gear 78 that is fixed to the engine static structure 36. The carrier 80 is coupled to drive the fan shaft 70. The disclosed geared architecture 48 may be referred to as a planetary gear system and provides a speed reduction ratio between the input shaft 72 and the fan shaft 70 that is equal to 1+ the gear ratio. In this example, the geared architecture 48 has a gear ratio of three (3.0) and therefore the speed reduction is 1+3.0=4.0.

Although a specific mounting configuration is disclosed by way of example, the fan drive electric motor 66 may be mounted in an alternate configuration that maintains the relative speed relationship the fan shaft 70 and the input shaft 72 and remain within the contemplation and scope of this disclosure.

The example fan drive electric motor 66 includes a permanent magnet rotor 94 mounted to drive the fan shaft 70. A first stator phase 96 and a second stator phase 98 are fixed relative to the rotor 94 on a portion of the engine static structure 36. The electric motor 66 is driven directly by electric power produced by the generator 64. The number and configuration of phases are disclosed by way of example and other numbers of phases as understood for electric motor and generator operation are within the contemplation and scope of this disclosure.

The example generator 64 includes a first generator portion 90 and a second generator portion 92. In this disclosed example, the first generator portion 90 is spaced axially apart from the second generator portion 92. Each of the generator portions 90, 92 provide power to a corresponding one of the first and second stator phases 96, 98 of the fan drive electric motor 66. A controller 68 controls the communication of electric power from the generator portion 90, 92 to the electric motor 66.

The first generator portion 90 includes a first rotor 84 mounted to an input shaft 72. The input shaft 72 is driven by the fan drive turbine that in this example is the low pressure turbine 46. The second generator portion 92 includes a second rotor 88 that is also mounted to the input shaft 72.

Figure 3:
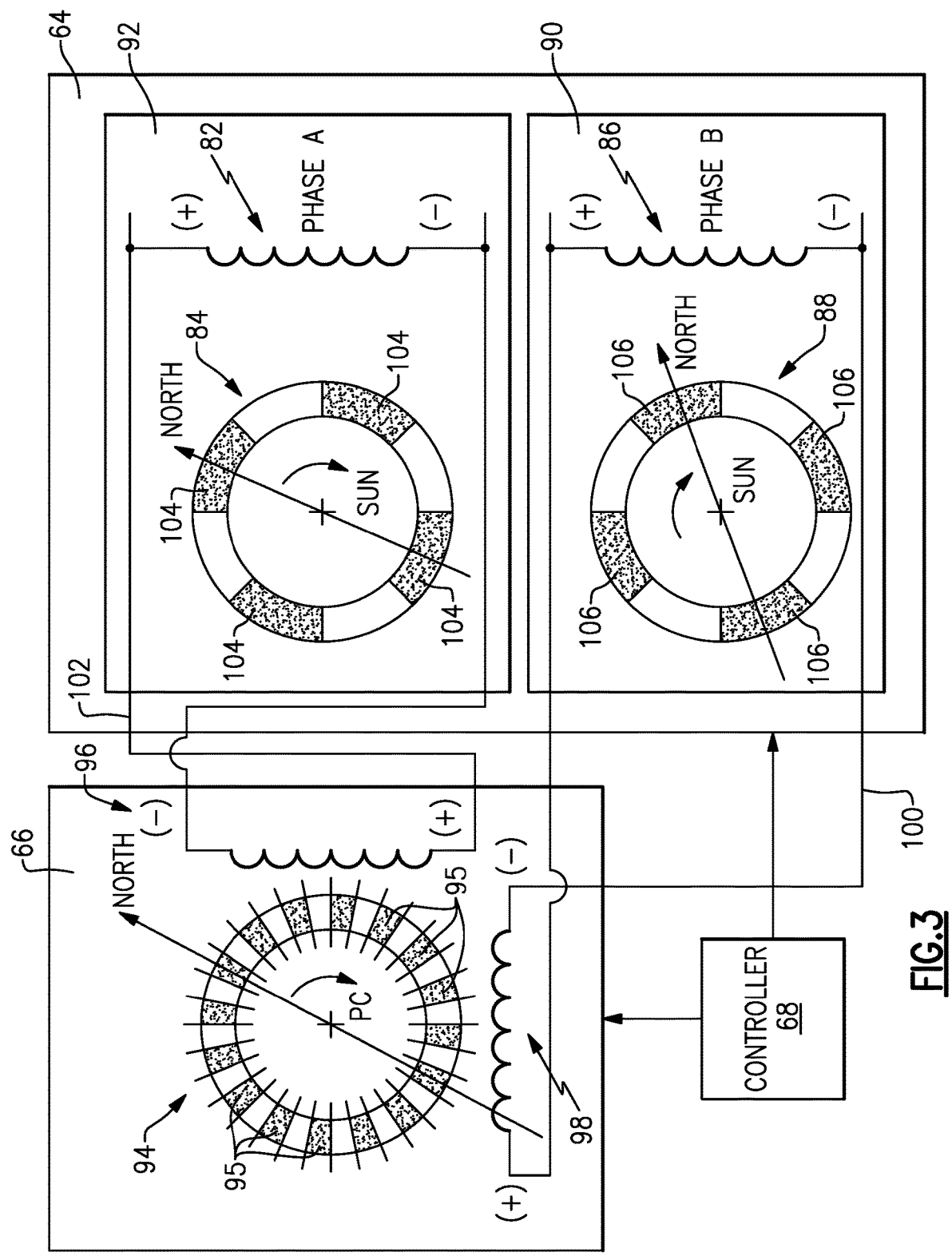
FIG. 3 is a schematic view of components of the example fan drive system.

Referring to FIG. 3, with continued reference to FIG. 2, the first rotor 84 includes a plurality of poles 104. Each of the poles 104 is a permanent magnet. In this example, four poles 104 are provided. The second rotor 88 includes a second plurality of poles 106. The second plurality of poles 106 includes four poles that are clocked relative to the first plurality of poles 104. In this disclosure the term clocked is utilized to describe the circumferential offset between the first set of poles 104 and the second set of poles 106. In this example, the second set of poles 106 is clocked 90 degrees relative to the first set of poles 104.

The relative radial clocking along with the number of poles in each of the first and second stators 82, 86 is combined with the relative speeds between the input shaft 72 and the fan shaft 70 to provide the required commutation between the first and second stator phases 96, 98. In this disclosed example and as discussed above, the speed reduction ratio between the speed of the input shaft 72 and the speed of the fan shaft 70 is four (4.0). The number of poles in each of the first and second stators 82, 86 is therefore four or a multiple of four to provide the corresponding commutation. Moreover, each of the stators 82, 86 will include more poles than that provided on the corresponding rotor 84, 88.

Referring to FIG. 3, with continued reference to FIG. 2, the rotor 94 of the fan drive electric motor 66 includes a plurality of poles 95. Each of the poles 95 is a permanent magnet. In this example, sixteen (16) poles are indicated. The number of permanent magnet poles 95 is four times (4×) the number of poles 104 of the first rotor 84 and four times the number of poles 106 of the second rotor 88 as the speed reduction ratio between the input shaft 72 and the speed of the fan shaft 70 is four (4.0). The number of poles of the first stator phase 96 is the same as the number of poles of first stator 82. The number of poles of the second stator phase 98 is the same as the number of poles of the second stator 86. Although depicted as two phases in the disclosed non limiting embodiment it should be understood that the concepts described herein are not limited to two phases as the teaching may be applied to other electric machine phase configurations including three or more phases in the generator 64 and motor 66 with pole counts commensurate with the speed reduction ratio of the geared architecture 48. As appreciated, for different gear ratios, different numbers of poles would be utilized to provide the required commutation to drive the electric motor 66.

Each generator portion 90, 92 provides the required phase shift needed to turn the rotor 94 of the fan drive electric motor 66. The relative clocking between the generator rotors 84, 88 and the motor rotor 94 combined with the relative speeds of the fan shaft 70 and the input shaft 72 provide a mechanical commutation. Accordingly, an electronic controller or commutator is not necessary to control operation of the motor 66. The controller 68 is provided to selectively turn the electric motor 66 on and off and to adjust an amount of power supplied, but is not utilized in this example embodiment as a commutator.

In operation, the generator 64 rotates with the input shaft 72. The input shaft 72 drives the geared architecture 48 to provide a first or primary rotational input to the fan shaft 70 and thereby the fan section 22. The fan shaft 70 is rotated at a second speed that is different and in this example less than a first speed of the input shaft 72. The generator 64 provides a first phase of electric power schematically indicated at 102 to the first stator phase 96 of the electric motor 66. A second phase of electric power indicated at 100 is provided to a second phase 98 of the electric motor 66. Commutation between the generator stator phases 82, 86 is provided by relative clocking between the generator phases combined with the relative speed between the input shaft 72 and the fan shaft 70. The first stator phase 82 of the generator 64 provides power to the first stator phase 96 of the electric motor 96. The second stator phase 86 provides power to the second stator phase 98 ninety degrees apart from the first stator phase 82 to provide the required commutation to drive the rotor 94. Although depicted as two phases in the disclosed non limiting embodiment it should be understood that the concepts described herein are not limited to two phases as the teaching may be applied to other electric machine phase configurations including three or more phases in the generator 64 and motor 66.

The supplemental input 35 provided by the electric motor 66 is implemented responsive to variable load demand on the fan drive turbine 46. The supplemental power input 35 provided by the motor 66 increases the load on the fan drive turbine 46 necessary to meet the decreased load needed to maintain the desired fan speed and propulsive output. Additionally, the supplemental input 35 can be disengaged to reduce power on the fan drive turbine 46 when a demanded load is increased.

The controller 68 governs operation of the fan drive system 62 and engagement of the supplemental input 35. The controller 68 can be a separate controller 68 or part of the overall engine and/or aircraft controller.

Figure 4:
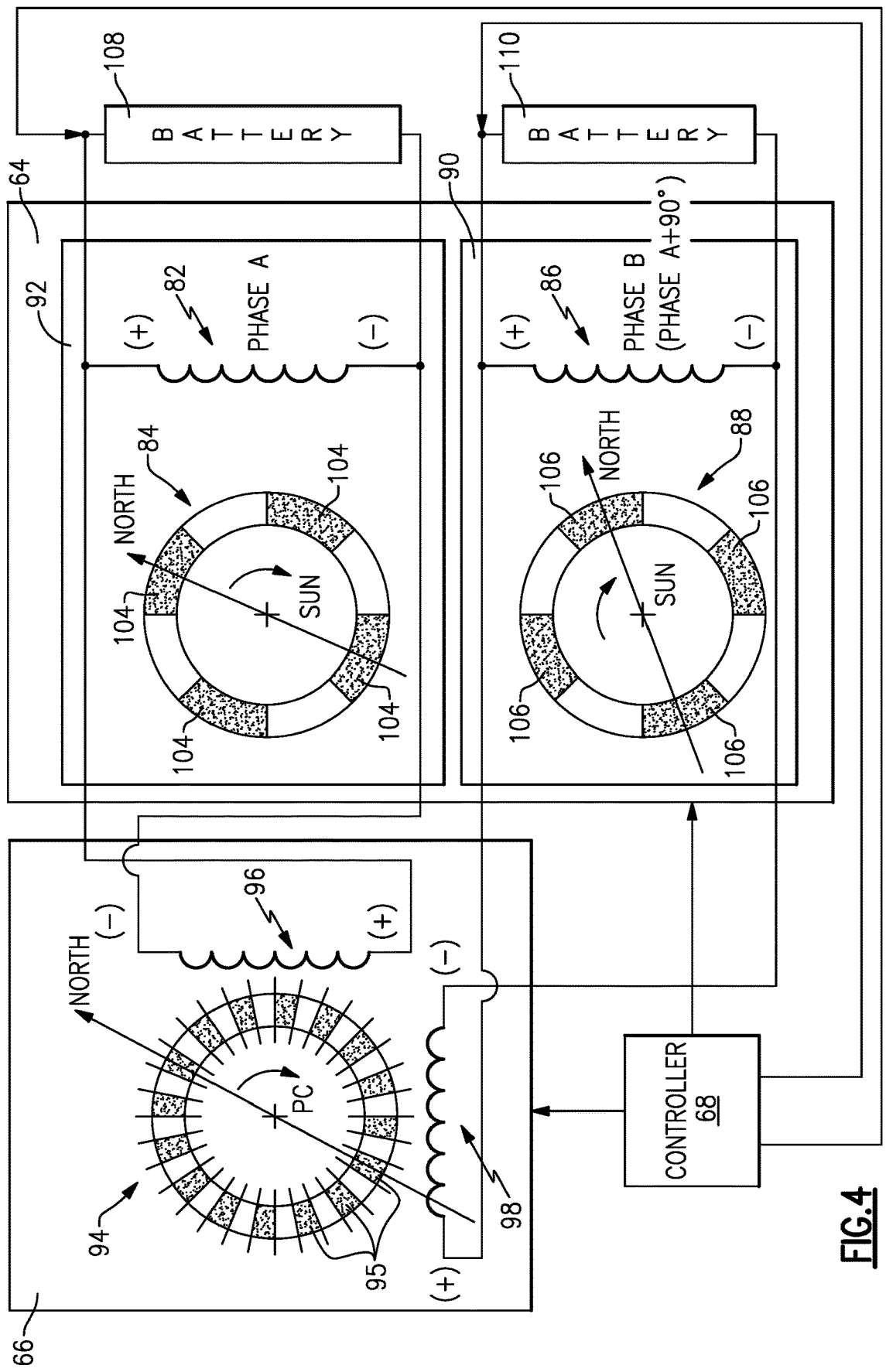
FIG. 4 is a schematic view of components of another example fan drive system.

Referring to FIG. 4 with continued reference to FIGS. 2 and 3, first and second batteries 108 and 110 are electrically coupled to the corresponding first and second generator portions 90, 92. The batteries 108 and 110 can supplement generated power and also enable storage of electric power not used to drive the electric motor 66. The supplemental power input 35 provided to the electric motor 66 by battery 108 and battery 110 is implemented responsive to variable load demand on the fan drive turbine 46. The supplemental power input 35 provided by the battery 108 and battery 110 decreases the load on the fan drive turbine 46 necessary to meet the increased load needed to maintain the desired fan speed and propulsive output. Additionally, the supplemental input 35 can be engaged to reduce power on the fan drive turbine 46 when a demanded load is increased.

Figure 5:
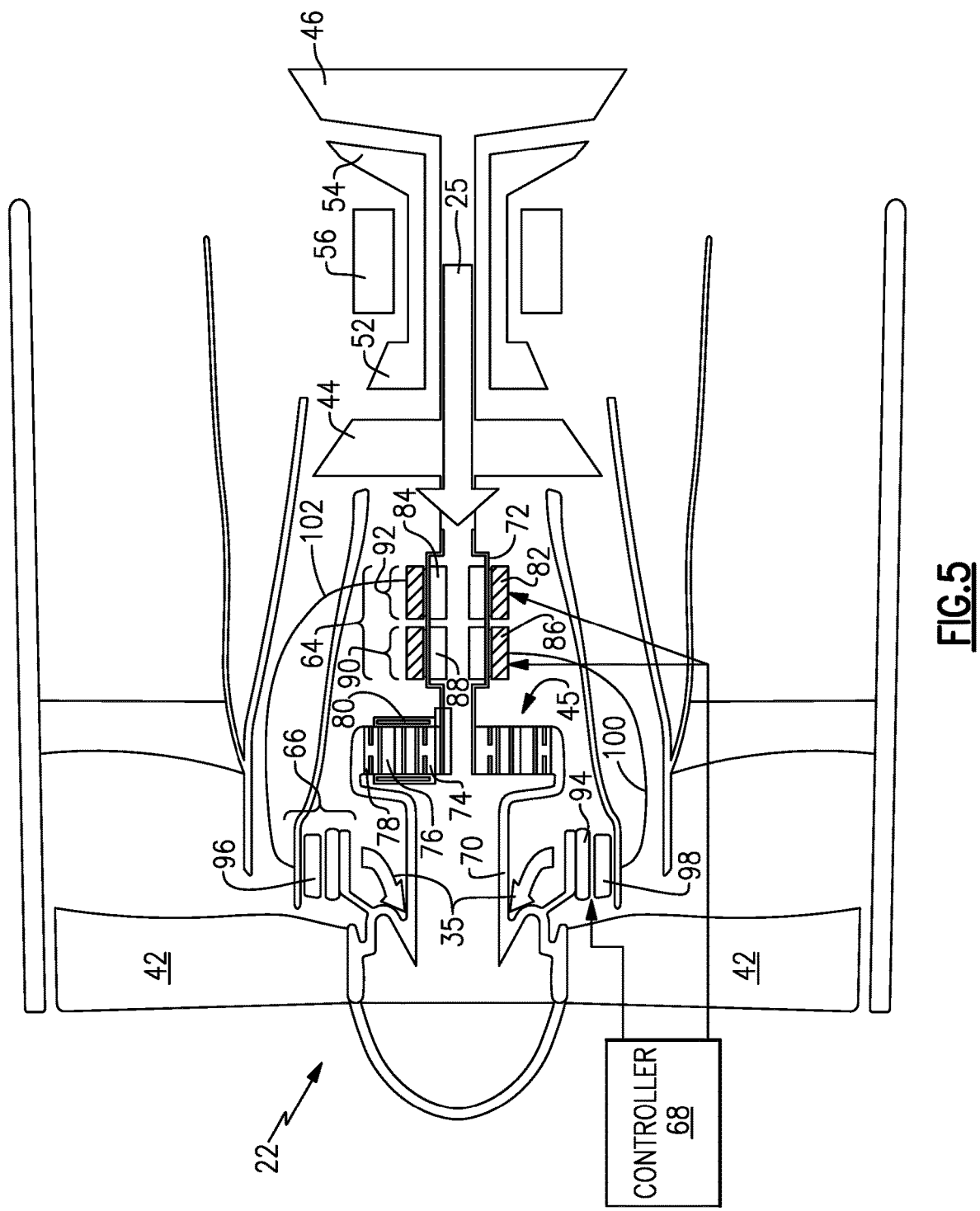
FIG. 5 is a schematic view of another example fan drive system.

Referring to FIG. 5, with continued reference to FIGS. 3 and 4, another embodiment of the fan drive system 62 includes another geared architecture 45 that is configured such that the fan shaft 70 is coupled to the ring gear 78. The example geared architecture 45 is sometimes referred to as a "star" gear system. The geared architecture 45 provides a speed reduction ratio between the shaft 72 and the fan shaft 70 that is equal to the gear ratio. In this example, the geared architecture 45 has a gear ratio of three (3.0) and therefore the speed ratio is 3.0. The number of permanent magnet poles 95 is three times (3×) the number of poles of the first rotor 88 and three times the number of poles of the second rotor 84 as the speed reduction ratio between the input shaft 72 and the speed of the fan shaft 70 is three (3.0). The number of poles of the first stator phase 96 is the same as the number of poles of first stator 82. The number of poles of the second stator phase 98 is the same as the number of poles of the second stator 86. The number of poles in each of the first and second stators 82, 86 is therefore three or a multiple of three to provide the corresponding commutation.

In the geared architecture 45, the fan shaft 70 is driven in an opposite direction compared to the input shaft 72 and therefore a phase shift of power provided by the first and second generators 90, 92 is required to provide proper rotation of the motor 66. The voltage polarity across first stator phase 96 of the electric motor 66 is connectively inverted. The voltage polarity of the second phase of electric power indicated at 100 is connected inverted in polarity to the second phase 98 of the electric motor 66.

Referring to FIG. 5, with continued reference to FIG. 3, another implementation of supplemental power input 35 opposes the rotation of fan blades 42. The voltage polarity across first stator phase 96 of the electric motor 66 is as shown in FIG. 3. The voltage polarity of the second phase of electric power indicated at 100 is connected with indicated polarity to the second phase 98 of the electric motor 66 as shown in FIG. 3. The supplemental input 35 provided by the electric motor 66 is implemented responsive to variable load demand on the fan drive turbine 46. Disengaging the supplemental input 35 removes the torque provided by electric motor 66 that opposes rotation of fan blades 42 and increases a reduction of power on the fan drive turbine 46 when a demanded load is increased.

The example fan drive system 62 includes parallel power drive 25 and drive 35 inputs to the fan section 22. The parallel inputs of power through the geared architecture 48 and the electric motor 66 enables the application of power to the fan section 22 to smooth variations in low pressure compressor power fluctuations and lag while also reducing dependence on compressor bleed to match compressor operation.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a fan driven by a fan shaft rotatable about an engine axis;
   a fan drive electric motor providing a supplemental drive input to the fan, wherein the fan drive electric motor includes a permanent magnet rotor mounted to the fan shaft and a first stator phase and a second stator phase supported on a static structure surrounding the permanent magnet rotor;
   a turbine section driving an input shaft;
   a geared architecture driven by the input shaft of the turbine section and coupled to the fan shaft to provide a main drive input for driving the fan; and
   a generator configured to communicate electric power to power the fan drive electric motor, the generator including a rotor supported on the input shaft and a stator disposed on a static structure relative to the rotor, wherein the generator includes a first stator and a first rotor including a first set of poles providing power to the first stator phase of the fan drive electric motor and a second stator and a second rotor including a second set of poles providing power to the second stator phase of the fan drive electric motor;
   the fan drive electric motor is electrically coupled to the first stator and the second stator and the first set of poles and the second set of poles are clocked relative to each other such that rotation of the input shaft commutates the first phase and the second phase to drive the fan drive electric motor; and
   the geared architecture is configured to provide a ratio between an input speed of the input shaft and an output speed of the fan shaft and commutation of the plurality of poles of the fan drive electric motor corresponds with a gear ratio and the number of poles in each of the first set of poles and the second set of poles.

2. The gas turbine engine as recited in claim 1, wherein the first rotor is spaced axially apart from the second rotor on the input shaft.

3. The gas turbine engine as recited in claim 1, including a controller controlling the communication of electric power to the fan drive electric motor.

4. The gas turbine engine as recited in claim 1, including a battery coupled to the generator, wherein the generator provides electric power to charge the battery.

5. The gas turbine engine as recited in claim 1, including a controller coupled to the fan drive electric motor and the generator, the controller configured to control operation of the fan drive electric motor and the generator.

6. A fan drive system for a gas turbine engine comprising:
   a fan driven by a fan shaft rotatable about an engine axis;
   a fan drive electric motor providing a supplemental drive input to the fan, the fan drive electric motor includes a permanent magnet rotor mounted to the fan shaft and a first stator phase and a second stator phase supported on a static structure surrounding the permanent magnet rotor;
   a geared architecture driven by an input shaft and coupled to the fan shaft to provide a main drive input for driving the fan, wherein the geared architecture is configured to provide a ratio between an input speed of the input shaft and an output speed of the fan shaft; and
   a generator driven by the input shaft configured to generate electric power and for driving the fan drive electric motor, wherein the generator includes a first stator and a first rotor including a first set of poles providing electric power to a first phase of the fan drive electric motor and a second stator and a second rotor including a second set of poles providing power to a second phase of the fan drive electric motor, wherein the first set of poles and the second set of poles are clocked relative to each other such that rotation of the input shaft commutates the first phase and the second phase to drive the fan drive electric motor and commutation of the plurality of poles of the fan drive electric motor corresponds with a gear ratio of the geared architecture and the number of poles in each of the first set of poles and the second set of poles.

7. The fan drive system as recited in claim 6, including a controller configured to control operation of the fan drive electric motor and the generator.

8. A method of operating a gas turbine engine comprising:
   generating electric energy with a generator driven by an input shaft driving a geared architecture at a first speed;
   driving a fan shaft at a second speed different than the first speed with a primary rotational input from the geared architecture; and
   driving the fan shaft with a supplemental rotational input with a fan drive electric motor driven by electric energy generated by the generator disposed on the input shaft, the fan drive electric motor including a permanent magnet rotor mounted to the fan shaft and a first stator phase and a second stator phase supported on a static structure surrounding the permanent magnet rotor, wherein the generator comprises a first generator portion providing electric power to a first phase of the fan drive electric motor and a first battery and a second generator providing electric power to a second phase of the fan drive electric motor and a second battery.

9. The method as recited in claim 8, including commutating electric power provided to the first phase and second phase of the electric motor by clocking a first set of poles of first generator portion relative to a second set of poles of the second generator portion.

10. The method as recited in claim 8, including engaging the supplemental rotational input with the fan drive electric motor responsive to a decreased load on a fan drive turbine driving the input shaft and disengaging the supplemental rotational input responsive to an increased load on the turbine section.

11. The method as recited in claim 10, including controlling operation of the fan drive electric motor with a controller responsive to a demand for increased power from the fan drive turbine.

12. The method as recited in claim 8, including commutating electric power provided to the first phase and second phase of the electric motor by charging and discharging a first battery and a second battery.

* * * * *